Patented Sept. 9, 1947

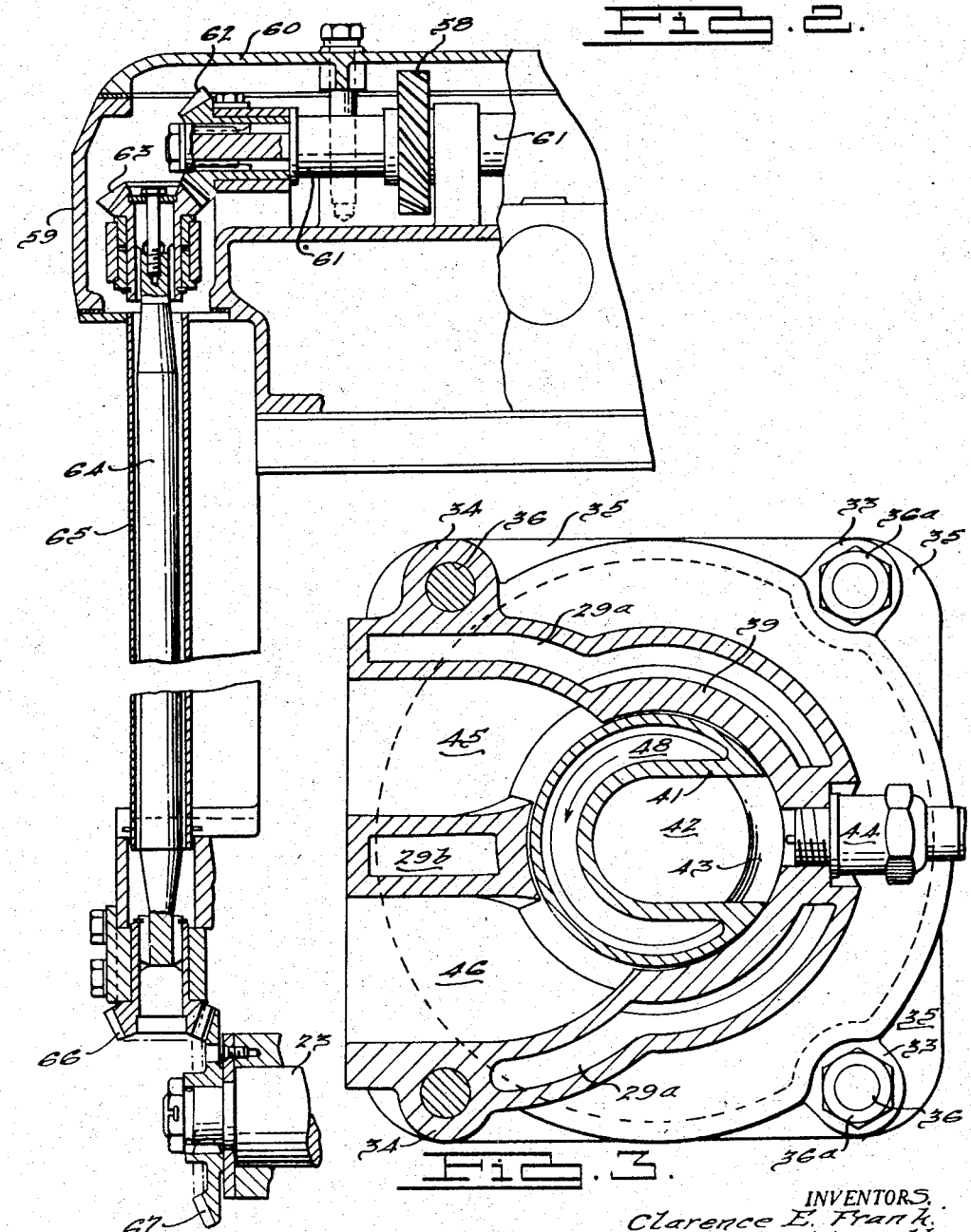

2,427,270

UNITED STATES PATENT OFFICE 2,427,270

ROTARY VALVE FOR INTERNAL-COMBUSTION ENGINES

Clarence E. Frank, Fraser, and Raymond A. Wyatt, Detroit, Mich., assignors to Briggs Manufacturing Company, Detroit, Mich., a corporation of Michigan Original application November 22, 1943, Serial No. 511,276. Divided and this application August 24, 1945, Serial No. 612,382

19 Claims. (Cl. 123—80)

This invention relates to internal combustion engines of the rotatable valve type and especially to engines in which a substantal portion of the combustion space for the cylinder at the time of firing is formed by a chamber within the valve. The invention has particular application to an engine having a rotatable, generally frusto-conical valve in the head provided with a bottom port communicating with the cylinder and a side port communicating with the combustion space within the valve.

An object of the invention is to provide improved means for driving the valve as well as improved means for yieldingly maintaining the valve in proper bearing relation to the cavity in the cylinder head within which the valve rotates.

A further object of the invention is to provide improved means for coupling the valve to the driving mechanism therefor.

Still another object of the invention is to provide improved means for supporting and mounting the rotatable valve and particularly for spring loading the valve so as to substantially counteract the pull on the valve during the suction stroke of the piston.

Other objects of this invention will appear in the following description and appended claims, reference being had to the accompanying drawings forming a part of this specification wherein like reference characters designate corresponding parts in the several views.

Fig. 2 is a fragmentary sectional elevation illustrating the driving mechanism for the rotatable valve or valves of the engine.

Fig. 3 is a section taken substantially through lines 3—3 of Fig. 1 looking in the direction of the arrows.

Figure 1:
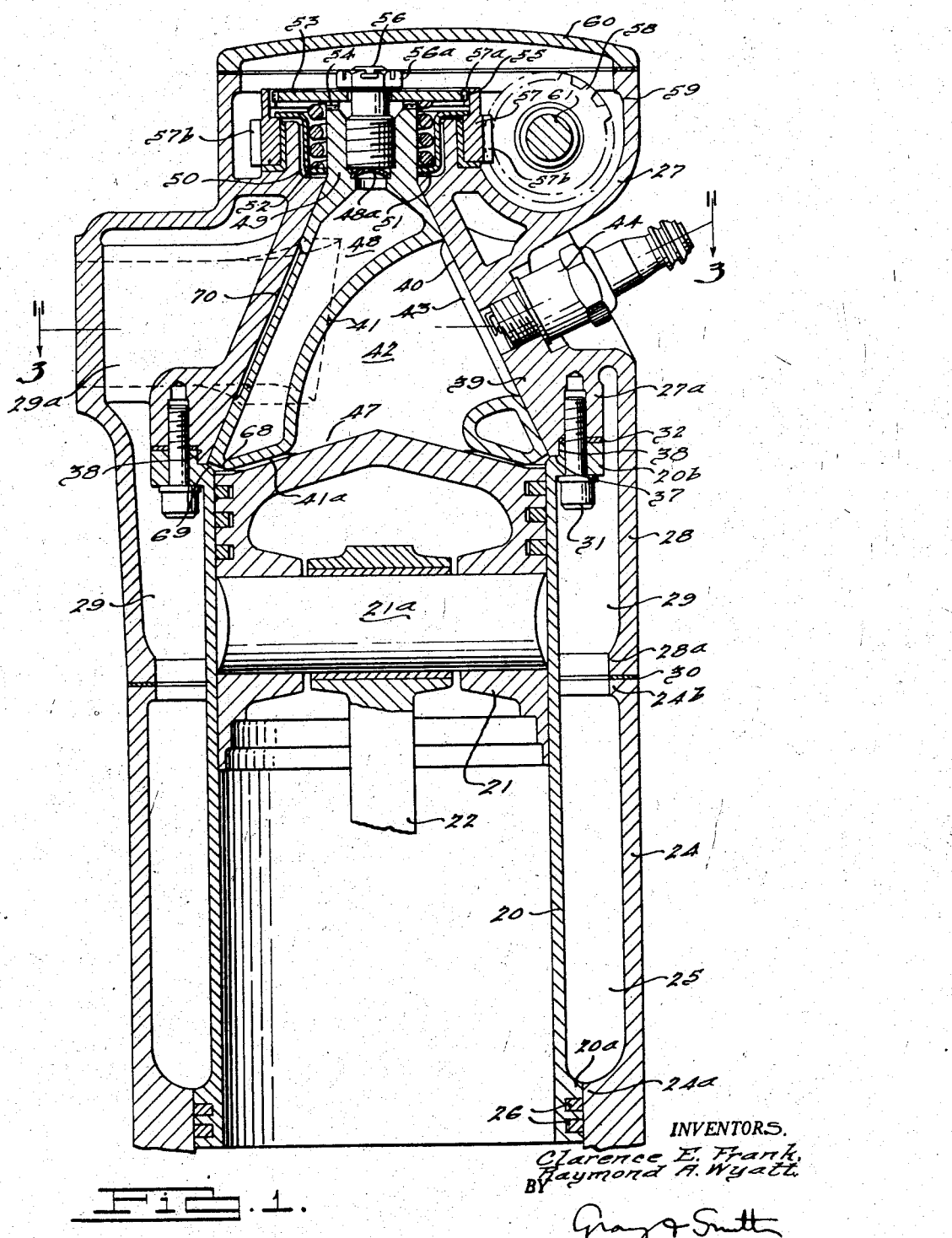
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a division of our application Serial No. 511,276, filed November 22, 1943, and which matured into U. S. Patent No. 2,419,066 on April 15, 1947.

The present invention is especially applicable to engines of the class having rotatable valves, preferably but not necessarily rotating continuously in one direction, for controlling the intake and firing of the fuel charge and for exhausting the products of combustion. In the illustrated embodiment of the invention, exemplifying one desirable adaptation thereof, a rotatable valve of the frusto-conical type is mounted in the cylinder head and is formed with substantially all or at least the major portion of the combustion chamber. The valve or rotor is formed with an opening or port in the side of the valve adapted to register with intake and exhaust passages and an ignition device during operation, there being an opening or port at the inner end or bottom of the rotor communicating at all times with the cylinder.

In the drawings we have illustrated, by way of example, one embodiment of the invention as applied to an internal combustion engine of the spark ignition type. However, it will be understood that the invention is not limited to an engine in which combustion is initiated by spark ignition. For most uses the engine is of the multi-cylinder types but for the purposes of simplification a single cylinder unit of the engine is illustrated in the present embodiment, it being understood that the remaining cylinders and associated parts are identical to the structure herein shown and described.

Referring to the drawings, the present engine comprises a cylinder 20 within which a suitable piston 21 is mounted for reciprocation. The piston is connected in the usual manner through a wrist pin 21a and connecting rod 22 to the crankshaft 23 of the engine. Surrounding a portion of the cylinder 20 is a cylindrical jacket 24 which is rigidly secured to the crankcase or forms substantially an integral portion of the crankcase. This jacket member 24 has an extended portion spaced from the wall of the cylinder 20 to provide a water cooling space or chamber 25 extending entirely around the cylinder. The cylindical jacket 24 terminates within the height of the cylinder 20 at a point somewhat below or inward of the wrist pin 21a when the piston is at the extreme outer end of its stroke.

The lower or inner end of the cylinder 20 is formed with an annular rib 20a forming a pilot portion slidable into and having a smooth fit within the inner cylindrical wall of the lower section 24a of the jacket member 24, the rib 20a carrying sealing rings 26 to prevent leakage of the coolant between the juxtaposed surfaces of the portions 20a and 24a.

The engine is provided with a cylinder head 27 which is cast with a depending wall or skirt 28 extending below the outer end of the cylinder and spaced from the cylinder wall to provide a liquid cooling space or chamber 29 adapted to form a continuation of the chamber 25. The lower or inner end of the wall or skirt 28 of the cylinder head is formed with an annular rib 28a adapted to cooperate with a corresponding ribbed portion 24b formed at the outer end of the jacket member 24. When the cylinder head is assembled the ribbed portion 28a is drawn down tightly against the ribbed portion 24b, there being a gasket 30 interposed between the juxtaposed surfaces of these portions adapted to be compressed to provide a liquid tight joint.

In the embodiment of Fig. 1 the outer end of the cylinder is formed with an outwardly extending annular flange 20b extending in juxtaposed relation to an annular boss 27a formed on the cylinder head. The overlapping portions 27a and 20b are secured together by means of a series of bolts 31 which are effective to clamp the cylinder head and cylinder tightly together, there being a gasket 32 interposed between the adjacent surfaces of the portions 27a and 20b. This gasket may be of the copper-asbestos type capable of sustaining high temperatures and pressure, and when the bolts 31 are tightened sufficiently the gasket 32 will provide a liquid and gas tight joint. The cylinder head is formed with series of lugs or ribs 33 and 34 bored to receive bolts 36 extending from bosses 35 on the jacket member 24 which, as stated, is fixed to the crankcase. The cylinder head may be drawn down tightly to the crankcase or jacket member 24 by nuts 36a on the bolts 36, thus connecting the jackets 24 and 28 tightly together at the water tight joint formed by the gasket 30.

The annular flange 20b of the cylinder is formed with an annular recess 37 at its inner side forming a vertical shoulder 38. The cylinder head is provided with a valve housing 39 which is integral with the portion 27a and has an annular portion fitting into the recess 37 and abutting against the shoulder 38, as clearly shown in Fig. 1. Thus, the inner end of the valve housing portion 39 of the cylinder head and the outer end of the cylinder 20 are not only rigidly bolted together but also have interfitting portions as a result of which it is possible to utilize the cylinder 20 as a means for positively controlling the thermal expansion of the valve housing during operation.

The valve housing portion 39 of the cylinder head is formed with a generally frusto-conical recess 40 within which is mounted a rotatable valve or rotor 41 which is also of generally frusto-conical construction having tapering outwardly converging walls corresponding generally in shape to the inner walls of the recess 40. The bottom or inner wall 41a of the valve is preferably tapered so as to correspond substantially to the taper of the piston head, the construction being such that the piston head will approach very closely the bottom of the valve 41 when the piston is at the outer end of its stroke.

The valve member 41 is formed with a side port 43 communicating with the combustion chamber 42 and adapted to register successively during rotation of the valve with a spark plug 44, an exhaust passage or conduit 45, and an intake conduit or passage 46 in the cylinder head, the direction of rotation of the valve being indicated by the arrow in Fig. 3. As also shown in this figure, the liquid coolant chamber 29 has extensions 29a in the cylinder head extending substantially around the valve member 41 and also extending along and in the height of the outer walls of the exhaust and intake passage 45 and 46. Another portion 29b of the coolant chamber extends through the dividing wall between these passages. From this construction it will be seen that substantially all portions of the cylinder, cylinder head, valve and intake and exhaust passages, which are subjected to heating during operation, are exposed to the cooling effect of the liquid circulated through the water jackets. The coolant is preferably introduced into the lower end of the chamber 25, circulated upwardly through the communicating chambers, which have a common outlet in the cylinder head.

In addition to the side port 43 the valve 41 has a central port or opening 47 at its inner end communicating with the cylinder. The valve member 41 is also formed with a cooling chamber 48 extending entirely around the combustion chamber of the valve member. This cooling chamber is adapted to receive any suitable cooling medium such, for example, as metallic sodium, which is sealed into the chamber by means of an expanding plug 48a.

In the present embodiment the valve or rotor 41 is driven at one-half engine or crankshaft speed. It is provided with a projecting stem 49 through the medium of which the driving mechanism for the valve is connected. The valve housing portion 39 of the cylinder head is provided with an annular recess 50 in its outer end through which the valve stem 49 extends. Within this recess is located a cup-shaped spring retainer member 51 adapted to receive a compression spring 52 surrounding the valve stem 49. The outer end of the spring engages a steel coupling disk 53. This disk is formed centrally thereof with an annular set of teeth 54 meshing with corresponding teeth formed on the end of the valve stem 49. The valve stem is tapped to receive a threaded stud or bolt 56 which carries a nut 56a engageable with the coupling disk 53 and adapted to be tightened to draw down the disk and maintain its teeth 54 in constant mesh with the teeth on the outer end of the valve stem. The spring 52 is, therefore, held under constant compression so as to yieldingly hold the valve upwardly within the frusto-conical recess 40 in the valve housing. The strength of this spring and the amount of preloading thereof is such that the effort exerted by the spring to raise the valve within the valve housing is sufficient to substantially offset or equal the effort exerted during the suction stroke of the piston to draw the valve downwardly and away from its seat.

The coupling disk 53 is provided with external teeth 55 meshing with internal teeth 57a on a ring gear 57. This gear in turn has external teeth 57b meshing with the teeth of a valve driving gear 58 secured to a longitudinally extending top shaft 61. The cylinder head is formed with a housing 59 provided with a removable closure 60 for housing the driving mechanism located in the cylinder head. The top shaft 61 at one end thereof carries a gear 62 meshing with a gear 63 secured to the upper end of a tower shaft 64. This tower shaft extends through a tube or housing 65 and carries at its lower end a gear 66 meshing with a gear 67 secured to the crankshaft 23 of the engine.

It will be noted that the bottom of the valve member 41 has a downwardly and outwardly tapering contour 41a corresponding to the tapering contour of the piston head. This tapering bottom portion 41a of the valve terminates at a point inward of the outer end of the cylinder wall in an outwardly and upwardly tapering or bevelled portion 68 which overlies the bevelled end 69 of the cylinder wall. A clearance of a few thousandths of an inch is at all times maintained between the bevelled or tapering bottom portion 68 of the valve and the bevelled end 69 of the cylinder wall so that at no time during operation will the valve contact the end of the cylinder. This clearance will be maintained even during the suction stroke of the piston since, as previously stated, the loading of the spring 52 is sufficient to counteract the downward pull on the valve during the suction stroke. The valve member is also preferably provided with an exterior relief area 70 extending entirely around the valve and substantially the height of the side port 43. This annular relief area may be formed either in the valve or in the wall 49 of the valve housing and may be constructed and serve the purposes in accordance with U. S. Pat. No. 2,409,034, dated Oct. 8, 1946.

We claim:

1. In an internal combustion engine, a rotatable valve having a projecting stem and also formed with a combustion chamber, a coupling disk overlying the end of the valve stem and provided with teeth meshing with teeth formed on the end of the stem, means adjustable axially of the valve for holding said teeth in mesh, said disk having peripheral teeth, and a ring gear having internal teeth meshing with said peripheral teeth and external teeth adapted to mesh with a driving gear.

2. In an internal combustion engine, a cylinder head, a rotatable valve in said head having a projecting stem, a compression spring embracing said stem and located in a recess in the head, a coupling member overlying the stem and operatively engaging the spring, cooperating teeth on said member and valve stem, means for maintaining said teeth in mesh and said spring under compression, and means for driving said disk to rotate the valve.

3. In an internal combustion engine, a cylinder head, a cylinder having a reciprocable piston, a rotatable frusto-conical valve in the head formed with a combustion chamber and provided with an axially extending stem, said stem terminating in transversely extending teeth, a spring embracing the stem, a coupling member having teeth meshing with said first named teeth, means for driving said member, and means for clamping the valve stem and coupling member together to place said spring under predetermined load effective to substantially counteract the pull on the valve during the suction stroke of the piston.

4. In an internal combustion engine, a cylinder head, a cylinder having a reciprocable piston, a rotatable frusto-conical valve in the head formed with a combustion chamber and provided with an axially extending stem, said stem terminating in teeth, a spring embracing the stem, a coupling member having teeth meshing with said first named teeth, means for driving said member, and means for clamping the valve stem and coupling member together to place said spring under predetermined load effective to substantially counteract the pull on the valve during the suction stroke of the piston.

5. In an internal combustion engine having a cylinder head, a rotatable valve in the head formed with a combustion chamber and provided with an axially extending stem terminating in transversely extending teeth, a spring embracing the stem, a coupling member having teeth meshing with said first named teeth, means for driving said member, and means for clamping the valve stem and coupling member together to place said spring under predetermined load effective to substantially counteract the pull on the valve during the suction stroke of the piston.

6. In an internal combustion engine having a cylinder head, a rotatable valve in the head formed with a combustion chamber and provided with an axially extending stem terminating in teeth, a spring embracing the stem, a coupling member having teeth meshing with said first named teeth, means for driving said member, and means for clamping the valve stem and coupling member together to place said spring under predetermined load effective to substantially counteract the pull on the valve during the suction stroke of the piston.

7. In an internal combustion engine, a rotatable valve having a portion formed with teeth, a member overlying said portion and having teeth meshing with said first named teeth, a gear meshing with a second set of teeth on said member, and means for driving said gear.

8. In an internal combustion engine, a rotatable valve having a portion formed with teeth, a member overlying said portion and having teeth meshing with said first named teeth, means for maintaining said teeth in mesh, a gear meshing with a second set of teeth on said member, and means for driving said gear.

9. In an internal combustion engine, a rotatable valve having a portion formed with teeth, a member overlying said portion and having teeth meshing with said first named teeth, a spring interposed between said member and a fixed portion of the engine, means for maintaining said teeth in mesh and said spring under compression, a gear meshing with a second set of teeth on said member, and means for driving said gear.

10. In an internal combustion engine, a rotatable valve having a portion formed with transversely extending teeth, a member overlying said portion and having transversely extending teeth meshing with said first named teeth, a gear meshing with a second set of teeth on said member, and means for driving said gear.

11. In an internal combustion engine having a cylinder head, a rotatable valve in said head having an axial stem portion formed with teeth, a member overlying said stem portion and having teeth meshing with said first named teeth, a gear coupled to said member, and means for driving said gear.

12. In an internal combustion engine having a cylinder head, a rotatable valve in said head having an axial stem portion formed with teeth, a member overlying said stem portion and having teeth meshing with said first named teeth, means for maintaining said teeth in mesh, a gear coupled to said member, and means for driving said gear.

13. In an internal combustion engine having a cylinder head, a rotatable valve in said head having an axial stem portion formed with teeth, a member overlying said stem portion and having teeth meshing with said first named teeth, a spring interposed between said member and a portion of the cylinder head, means for maintaining said teeth in mesh and said spring under compression, a gear coupled to said member, and means for driving said gear.

14. In an internal combustion engine having a cylinder head, a rotatable valve in said head having an axial stem portion formed with transversely extending teeth, a member overlying said stem portion and having transversely extending teeth meshing with said first named teeth, a gear coupled to said member, and means for driving said gear.

15. An internal combustion engine having a cylinder head and a rotatable valve therein provided with a projecting stem and also formed with a combustion chamber, a member provided with teeth meshing with teeth formed on the stem, said member having external teeth, and a ring gear having internal teeth meshing with said external teeth and also having external teeth adapted to mesh with a driving gear.

16. An internal combustion engine according to claim 15 including resilient means for holding the teeth of said member and ring gear in mesh.

17. An internal combustion engine according to claim 15 including a device having threaded connection with said stem for holding the teeth of the stem and said member in mesh.

18. An internal combustion engine having a cylinder head and a rotatable valve therein provided with a projecting stem and also formed with a combustion chamber, a member provided with teeth meshing with teeth formed on the stem, said member having external teeth, a ring gear having teeth meshing with said external teeth, means including a compression spring for holding said ring gear in position, and a device having threaded connection with the valve stem for maintaining said spring under predetermined compression.

19. An internal combustion engine having a cylinder head and a rotatable valve therein provided with a projecting stem and also formed with a combustion chamber, a member provided with teeth meshing with teeth formed on the stem, said member having peripheral teeth, a gear having teeth meshing with said peripheral teeth and also having teeth adapted to mesh with a driving gear, and adjustable means for maintaining said teeth in mesh.

CLARENCE E. FRANK.
RAYMOND A. WYATT.

REFERENCES CITED

The following references are of record in the file of this patent:

UNITED STATES PATENTS

| Number | Name | Date |
|---|---|---|
| 2,283,594 | Aspin | May 19, 1942 |
| 2,378,120 | Aspin | June 12, 1945 |
| 2,384,461 | Gernandt | Sept. 11, 1945 |
| 1,218,296 | Moorhead | Mar. 6, 1917 |